United States Patent [19]

Hack et al.

[11] 4,074,002

[45] Feb. 14, 1978

[54] MAGNETIC RECORDING MEDIA HAVING A LOW COEFFICIENT OF FRICTION

[75] Inventors: Joachim Hack, Ludwigshafen; Dieter Schaefer, Lindenberg; Herbert Motz, Ludwigshafen, all of Germany

[73] Assignee: BASF Aktiengesellschaft, Ludwigshafen, Germany

[21] Appl. No.: 664,644

[22] Filed: Mar. 8, 1976

[30] Foreign Application Priority Data

Mar. 21, 1975 Germany ............................. 2512450

[51] Int. Cl.$^2$ ............................................. H01F 10/02
[52] U.S. Cl. ............................ 428/331; 252/62.54; 360/134; 427/128; 428/539; 428/900
[58] Field of Search ............... 428/908, 329, 331, 539; 427/177, 128, 129, 130, 131, 132; 252/62.54 C, 62.54, 62.55, 62.56, 62.57; 360/134

[56] References Cited

U.S. PATENT DOCUMENTS

| | | | |
|---|---|---|---|
| 3,687,725 | 8/1972 | Hartmann et al. | 428/900 |
| 3,833,412 | 9/1974 | Akashi et al. | 428/900 |
| 3,843,404 | 10/1974 | Haefele et al. | 428/900 |

*Primary Examiner*—George F. Lesmes
*Assistant Examiner*—Stanley S. Silverman
*Attorney, Agent, or Firm*—Keil, Thompson & Shurtleff

[57] ABSTRACT

Magnetic recording media comprising a base and, applied thereto, at least one firmly adhering magnetic layer based on magnetic particles dispersed in a mixture of organic binders, wherein at least the uppermost magnetic layer additionally contains non-magnetic particles of precipitated silica having a primary particle diameter of from 0.02 to 0.1$\mu$, a secondary particle diameter of from 2 to 4$\mu$ and a pH of from 5 to 8.

As a result of the incorporation of such a precipitated silica into the magnetic layer, the coefficient of friction between the latter and metals remains uniformly low even after prolonged use, and no stick-slip motion occurs.

3 Claims, No Drawings

MAGNETIC RECORDING MEDIA HAVING A LOW COEFFICIENT OF FRICTION

The present invention relates to magnetic recording media comprising a base and, applied thereto, at least one firmly adhering magnetic layer based on a finely divided magnetic pigment dispersed in a mixture of organic binders, wherein the coefficient of friction between the magnetic layer and metal is reduced and in particular does not increase significantly after prolonged use.

Magnetic layers which have to conform to high standards with respect to life and wear resistance, especially for computer, language laboratory or video applications, must exhibit a very low coefficient of friction on parts of the apparatus which come into contact therewith and which usually consist of metal.

It is of particular importance that the coefficient of friction between the magnetic coating and metal surfaces, e.g., brass, steel, chromium and mumetal, should remain constant over the period of use, i.e., that the coefficient of friction of frequently used tapes, of which the surface, or parts of the surface, may have undergone many thousands of head passes, should not increase after use. In practice it has been found that this requirement is difficult to satisfy, since, if a tape is used frequently, firstly the lubricating film present on the surface of magnetic recording media which contain lubricant is substantially worn away, and, secondly, the tape surface becomes highly polished as a result of the continuous sliding contact with the parts of the apparatus with which it is in contact, such as heads and guide pins and as a result becomes very smooth. Not only the removal of the lubricating film, but also a high degree of smoothness of the surface promotes intimate contact between the surface of the magnetic tape and the metal surfaces which it touches, and this can, as a result of the increase in the forces of adhesion between the metal surfaces and the magnetic tape surface, result in a sharp rise in the coefficient of friction and in the occurrence of stick-slip motion. In extreme cases, the magnetic recording medium may stick to the metal parts. In such a case, which may be encountered in various types of machines, but above all on single capstan tape drives, the friction between the surface of the magnetic recording medium and the metal components with which it is in contact, above all magnetic heads, has risen to such an extent that the torque of the capstan is no longer high enough to transport the magnetic tape.

The measures previously proposed for overcoming this problem consist primarily in the addition of various liquid or solid lubricants. However, all these lubricants have the disadvantage that they are worn away to a greater or lesser extent and polishing of the surface of the coating occurs in sustained operation, as a result of which the undesirable increase in friction cannot be prevented.

To improve the mechanical properties, and especially in order to eliminate cupping of the tape, German Patent 853,211 has already proposed adding to the magnetic coating non-ferromagnetic finely divided particles of about the same size as the magnetic particles.

German printed application No. 1,287,633 discloses the addition of relatively large amounts, i.e., from about 11 to 20%, based on the dried magnetic coating, of abrasive particles e.g., particulate chromium dioxide, aluminum oxide, carborundum or silicon dioxide, to the magnetic coating in order to keep the magnetic head clean and remove the oxide deposits which form on the head. This measure has the disadvantages that, firstly, the addition of such a high proportion of magnetically inert material causes a significant deterioration in the magnetic properties and hence in the read voltage and, secondly, that abrasive particles, which inherently have a very rough surface with sharp edges, though capable of cleaning the head, promote wear, necessitating premature replacement of the head. German published application No. 2,124,174 also discloses the addition of non-ferromagnetic particles to the magnetic coating in order to increase the wear resistance whilst achieving a good signal-to-noise ratio; these particles have at least one dimension not less than the thickness of the magnetic coating and are harder than the binder, but as they also fall under the category of abrasives, they have the disadvantages already mentioned.

U.S. Pat. No. 3,687,725 teaches that the formation of deposits on magnetic heads can be prevented by the addition of a combination of inorganic materials; specifically, soft materials of sheet structure (with a Mohs' hardness of less than 6) are combined with hard cubic particles. It is true that tapes produced therewith remove any deposits which may be present on the magnetic heads, but, when such a combination of inorganic materials is added, it is not possible to keep the coefficient of friction of the tape constant in sustained operation and to reliably prevent stick-slip motion.

It is an object of the present invention to provide magnetic recording media of which the magnetic coating, even after very long use, has a uniformly low coefficient of friction, and which do not stick to parts of the recording and/or playback apparatus in the tape path or exhibit stick-slip motion.

We have found that this object is achieved, and that the required properties are exhibited, by magnetic recording media comprising a flexible base and, applied thereto, at least one firmly adhering magnetic layer, at least the uppermost magnetic layer consisting essentially of an organic binder mixture and finely divided magnetic particles and non-magnetic particles, if the non-magnetic particles used are particles of precipitated silica having a mean primary particle diameter of from 0.02 to $0.1\mu$, a mean secondary particle diameter of from 2 to $4\mu$ and a pH of from 5 to 8.

It has proved particularly advantageous to add the precipitated silica to the magnetic layer in an amount of from 0.5 to 8 percent by weight, preferably from 1 to 4 percent by weight, based on the dry magnetic layer.

The precipitated silica contained in the magnetic layer of the magnetic recording medium of the invention may be obtained by the conventional method of precipitating alkali metal silicate solutions with acids, preferably with sulfuric acid, while ensuring that the silica sol intermediate state is circumvented. The silica is obtained directly in finely divided form and no longer requires comminution by milling. An advantageous procedure is to add the acid to a water glass solution, with vigorous stirring, or to run the water glass solution and the acid separately into an aqueous solution which is kept neutral. The finely divided precipitated silica is purified by washing or by means of ion exchangers. It has a tap density of from 0.08 to 0.2 g/cm$^3$, a loss of weight on drying of from 2 to 5%, a loss of weight on ignition of from 4 to 6% and an Al$_2$O$_3$ content of from 0.2 to 0.4%. The particles are spherical in shape and the average primary particle diameter is from 0.02 to $0.1\mu$. Almost all of these primary particles agglomerate to form secondary particles. The mutual adhesion of the primary particles is so strong that even a prolonged dispersing treatment does not destroy the structure of the secondary particles, the mean diameter of which is from 2 to 4$\mu$ and preferably about 3$\mu$. The pH of a suitable precipitated silica is from 5 to 8, measured on a 4% strength aqueous suspension in accordance with DIN 53,200. This precipitated silica has spherical particles and, in contrast to pyrogenic silica, has no sharp edges and is therefore unsuitable for use as an abrasive. Pyrogenic silica is manufactured by decomposing silicon tetrahalides with steam at high temperatures, and has a tap density of from 0.02 to 0.1 g/cm$^3$, a loss of weight on drying of less than 1%, a loss of weight on ignition of less than 2% and an Al$_2$O$_3$ content of less than 0.1%. The mean primary and secondary particle diameter can be less than 1 and more than 6$\mu$ respectively. This pyrogenic silica cannot be employed for the purposes of the invention.

The precipitated silica can be added to the mixture to be dispersed, which consists of one or more magnetic pigments, the binder mixture, dispersing agents, lubricants and, if appropriate, further solvents and other additives, at the start and at any time during the dispersing operation. It is also possible to stir the silica into the previously prepared dispersion by means of a high-speed stirrer, e.g., a saw-blade stirrer rotating at about 1,000 rpm.

The magnetic coatings of the magnetic recording media of the invention may be produced by conventional methods. The magnetic pigment used is preferably finely divided acicular gamma-iron(III) oxide having an average particle size of from 0.1 to 2$\mu$ and especially of from 0.1 to 0.9$\mu$. Other suitable magnetic pigments for the magnetic recording media of the invention are cubic gamma-iron(III) oxide, cobalt-modified gamma-iron(III) oxide and the finely divided alloys of heavy metals conventionally used for this purpose, especially alloys of iron, cobalt and/or nickel, and also ferromagnetic chromium dioxide.

The binders used for the dispersion of the finely divided magnetic pigment and the particulate non-magnetic material may be any of the binders conventionally used for the production of magnetic coatings e.g., solvent-soluble copolyamides, polyvinylformals, polyurethane elastomers, mixtures of polyisocyanates and polyhydroxy compounds of relatively high molecular weight, and vinyl chloride polymers containing more than 60% of polymerized vinyl chloride units, e.g., copolymers of vinyl chloride with comonomers such as vinyl esters of monocarboxylic acids of 2 to 9 carbon atoms, esters of aliphatic alcohols of 1 to 9 carbon atoms and ethylenically unsaturated carboxylic acids of 3 to 5 carbon atoms, e.g., the esters of acrylic acid, methacrylic acid or maleic acid, or these carboxylic acids themselves, as well as hydroxyl-containing vinyl chloride copolymers which can be manufactured by partial saponification of vinyl chloride/vinyl ester copolymers or direct copolymerization of vinyl chloride with hydroxy-containing monomers, e.g., allyl alcohol, 4-hydroxybutyl acrylate or methacrylate or 2-hydroxyethyl acrylate or methacrylate. Further suitable binders are mixtures of polyurethane elastomers with polyvinylformals, phenoxy resins and PVC copolymers of the stated composition.

The use of commercially available elastomers, for example polyester-urethanes obtained from adipic acid, 1,4-butanediol and 4,4-diisocyanatodiphenylmethane, has proved advantageous, since such binders or binder combinations result in magnetic recording media having a particularly long life. Since it is precisely magnetic layers containing a polyurethane elastomer which show an undesirable increase in the coefficient of friction after repeated use, this effect can be prevented by the addition of precipitated silica of the type described.

In general, from 10 to 13 parts by weight of magnetic pigment, usually gamma-iron(III) oxide, are employed per 2.5 to 4.5 parts by weight of binder when manufacturing magnetic recording media. In each specific case, the relative proportions of the binder and magnetic pigment can easily be determined in a few experiments.

The non-magnetic bases for the magnetic coating may be any of those conventionally employed, i.e., flexible bases, e.g., films or tapes of conventional thickness based on polyvinyl chloride or polyesters such as polyethylene terephthalate. It is possible, and sometimes advantageous, to apply an adhesion-promoting intermediate layer, e.g, one based on a vinylidene chloride copolymer, to the base before applying the magnetic coating.

The finished dispersion is applied to the base by conventional methods. After orienting the magnetic particles and drying the layer, the coated base material is advantageously calendered between optionally heated rollers. The thickness of the magnetic layer(s) is generally from 2 to 15$\mu$.

In order to achieve special electroacoustic properties for special applications, it has proved advantageous to apply to the base more than one magnetic layer, the layers having identical or different properties. In such a case it suffices if the precipitated silica is only present in the uppermost magnetic layer of the magnetic recording medium of the invention.

Compared with conventional magnetic recording media, the magnetic recording media of the invention are distinguished by their constant low coefficient of friction. They reliably avoid an adverse increase in the coefficient of friction which is found, above all, in tapes which are subjected to repeated head passes, as in the case of computer tapes and language laboratory tapes, and which finally leads to faults during operation due to stick-slip motion which can lead to longitudinal vibrations, resulting in a frequency-modulated signal during recording and playback. The magnetic recording media of the invention have extremely high resistance to mechanical wear. However, the addition of precipitated silica does not increase the abrasivity of the magnetic coatings and hence does not shorten the life of the magnetic heads and other metal parts which are in contact with the tape surface.

In the Examples and Comparative Experiments which follow, parts and percentages are by weight, unless stated otherwise. Parts by volume bear the same relation to parts by weight as the liter to the kilogram.

EXAMPLE 1

The following materials are introduced into a ball mill having a capacity of 30,000 parts by volume and containing 30,000 parts of steel balls 4 to 6 mm in diameter; 3,500 parts of acicular gamma-iron(III) oxide particles having an average length of about 0.8$\mu$; 210 parts of a conductive carbon; 45 parts of soybean lecithin; 21 parts of butyl stearate; 10 parts of a dimethylsilicone oil; 9 parts of stearic acid; 9,220 parts of a solution of 800 parts of a polyester-urethane (manufactured from adipic acid, 1,4-butanediol and 4,4-diisocyanatodiphenylmethane and having a K value of about 60 and a Shore A hardness of 95) and 200 parts of a thermoplastic high molecular weight phenoxy resin (manufactured from bisphenol A and epichlorohydrin and having a molecular weight of about 30,000) in 8,220 parts of a solvent mixture of equal parts of tetrahydrofuran and dioxane; and 70 parts of a precipitated silica, manufactured by adding sulfuric acid to an aqueous sodium silicate solution. The silica consists of primary particles having a mean diameter of $0.06\mu$ which agglomerate to form secondary particles of about $3\mu$. The pH of the silica is about 7.

This mixture is dispersed for about 70 hours. The dispersion is filtered under pressure in a conventional manner, and then applied to a polyethylene terephthalate film, passed through a magnetic field to orient the magnetic particles in the coating, and dried at from 50° to 90° C. The coated web is finally calendered by passing it between polished rollers heated to about 50° to 80° C. After this treatment the magnetic coating is about $10\mu$ thick. For testing purposes, the coated film is cut into ½ inch wide tapes.

TEST METHOD

The tapes are tested as follows:
1. Frictional force measurement

The frictional force of the virgin magnetic coating on a chromium-plated steel roller is measured in accordance with IBM's ½ inch magnetic tape specification, Form No. 570-0295, Cat. No. 10SD01-1. The frictional force is a measure of the friction prevailing between the tape surface and the parts of the apparatus with which it is in contact, and is given in g. To ensure low wear characteristics and good running properties on the tape transport, the frictional force should be low and remain constant over the period of use.

2. Sustained operation test

A piece of magnetic tape 25 cm long is subjected to 50,000 head passes on a commercially available IBM 2401 tape drive. The mechanical resistance of the magnetic tape is determined by assessing the increase in errors which occurs at a recording density of 3,200 fci and the extent to which the tape surface has been scratched.

3. Frictional force measurement after sustained operation test

The frictional force of the used piece of tape is measured as described under 1. As a quantitative measure of the occurrence of stick-slip motion, the two limits between which the frictional force fluctuates are also given.

4. Signal level measurement

The signal level is measured in millivolts on a standard tape transport at a recording density of 3,200 fci, and referred to the NBS reference tape, the signal level of which is taken to be 100%. All deviations from the reference signal level are given in percent. Tapes whose signal level is above that of the reference tape are regarded as advantageous for practical applications.

5. Head wear

The head wear is measured comparatively in terms of the loss in weight of small mumetal discs (7 mm diameter, 0.35 mm thickness) which are abraded by the tapes. The loss in weight of the mumetal discs in mg, produced in the course of 60 minutes by an endless 20 m long loop of the test specimen moving at a speed of 1 meter/second, is determined. Magnetic coatings which cause only slight wear are particularly desirable, since this characteristic ensures that the magnetic heads have a long life.

EXAMPLE 2

The procedure followed is as in Example 1 except that 140 parts of the precipitated silica mentioned in Example 1 are used.

EXAMPLE 3

The procedure of Example 1 is followed, but no silica is added to the batch to be dispersed; instead, the silica is added after the dispersion operation is over. 5.4 parts of the precipitated silica described in Example 1 are added to 100 parts of dispersion taken from the mill and stirred into the latter for 1 hour by means of a high-speed stirrer drive (about 1,000 rpm) and a saw-tooth stirrer blade.

The test results obtained with the tapes of Examples 1 to 3 and the corresponding Comparative Experiments A to D, described below, are shown in Table 1.

COMPARATIVE EXPERIMENT A

The experiment is carried out analogously to Example 1, but no precipitated silica is added.

COMPARATIVE EXPERIMENT B

The procedure followed is as in Example 2, but instead of the precipitated silica described there, 140 parts of silica in the form of finely ground quartz powder having a mean particle size of about $2\mu$ are used. The particles are polyhedral, with fractured edges and corners.

COMPARATIVE EXPERIMENT C

The procedure followed is as in Example 2, but instead of the precipitated silica described there, 140 parts of silica in the form of finely ground quartz powder having a mean particle size of about $12\mu$ are used. The particles are polyhedral, with sharp fractured edges and corners.

COMPARATIVE EXPERIMENT D

The procedure of Example 2 is followed, but instead of the precipitated silica described there, 140 parts of a pyrogenic inactive silica are employed. The secondary particles of this silica, which are composed of primary particles of less than $0.1\mu$, have a mean diameter of about $8\mu$ and a pH of 3.5.

TABLE 1

| | Frictional force (g) | | | | Signs of wear after sustained operation test | | Head wear (mg) | Read voltage (deviations in % with reference to NBS reference tape) |
| | Before sustained operation test | | After sustained operation test | | | | | |
| | Mean value | Stick-slip motion | Mean value | Stick-slip motion | Scratching | Increase in errors | | |
|---|---|---|---|---|---|---|---|---|
| Example 1 | 26 | none | 32 | none | none | 0 | 0.26 | + 6 |
| Example 2 | 22 | none | 28 | none | none | + 1 | 0.28 | + 5 |

TABLE 1-continued

| | Frictional force (g) | | | | Signs of wear after sustained operation test | | Head wear (mg) | Read voltage (deviations in % with reference to NBS reference tape) |
| | Before sustained operation test | | After sustained operation test | | | | | |
| | Mean value | Stick-slip motion | Mean value | Stick-slip motion | Scratching | Increase in errors | | |
| --- | --- | --- | --- | --- | --- | --- | --- | --- |
| Example 3 | 24 | none | 30 | none | very slight | 0 | 0.31 | 0 |
| Comparative Experiment A | 34 | 32–36 | 51 | 34–68 | moderate | + 7 | 0.25 | + 14 |
| Comparative Experiment B | 33 | none | 39 | 33–45 | very slight | 0 | 0.46 | − 2 |
| Comparative Experiment C | 30 | none | 41 | 35–48 | very slight | + 1 | 0.58 | − 11 |
| Comparative Experiment D | 26 | none | 66 | 42–90 | marked | + 11 | 0.32 | + 3 |

EXAMPLE 4

The following materials are introduced into a ball mill having a capacity of 30,000 parts by volume and containing 30,000 parts of steel balls 4 to 6 mm in diameter: 3,150 parts of acicular gamma-iron(III) oxide particles having an average length of about $0.8\mu$; 4,905 parts of a solution of 235 parts of a commercial polyester-urethane, manufactured from adipic acid, 1,4-butanediol and 4,4-diisocyanatodiphenylmethane and about 20 parts of a polyvinylformal binder (82% of vinylformal units, 12% of vinyl acetate units and 6% of vinyl alcohol units), in 4,650 parts of a solvent mixture of equal parts of tetrahydrofuran and dioxane; 80 parts of sodium oleate; and 94.5 parts of the precipitated silica described in Example 1.

This mixture is dispersed for 70 hours. A further 235 parts of the above polyester-urethane and 115 parts of the above polyvinylformal binder dissolved in 4,570 parts of a mixture of equal parts of tetrahydrofuran and dioxane, and 31.5 parts of a silicone oil modified with polyether units, are then added to the dispersion. The batch is further processed as described in Examples 1.

The test results obtained with the tapes of Example 4 and the corresponding Comparative Experiments E to H, described below, are shown in Table 2.

COMPARATIVE EXPERIMENT E

The procedure of Example 4 is followed, but no precipitated silica is added.

COMPARATIVE EXPERIMENT F

The procedure of Example 4 is followed, but instead of the precipitated silica described there, 94.5 parts of silica in the form of finely ground quartz powder having a mean particle size of about $2\mu$ are used. The particles are polyhedral, with fractured edges and corners.

COMPARATIVE EXPERIMENT G

The procedure of Example 4 is followed, but instead of the precipitated silica described there, 94.5 parts of silica in the form of finely ground quartz powder having a mean particle size of about $12\mu$ are employed. The particles are polyhedral, with sharp fractured edges and corners.

COMPARATIVE EXPERIMENT H

The procedure of Example 4 is followed, but instead of the precipitated silica described there, 94.5 parts of a pyrogenic inactive silica are used. The secondary particles of this silica, which are composed of primary particles of less than $0.1\mu$, have a mean diameter of about $8\mu$ and a pH of 3.5.

TABLE 2

| | Frictional force (g) | | | | Signs of wear after sustained operation test | | Head wear (mg) | Read voltage (deviations in % with reference to NBS reference tape) |
| | Before sustained operation test | | After sustained operation test | | | | | |
| | Mean value | Stick-slip motion | Mean value | Stick-slip motion | Scratching | Increase in errors | | |
| --- | --- | --- | --- | --- | --- | --- | --- | --- |
| Example 4 | 25 | none | 27 | none | very slight | 0 | 0.16 | + 7 |
| Comparative Experiment E | 32 | none | 39 | 33–45 | moderate | + 4 | 0.12 | + 12 |
| Comparative Experiment F | 31 | none | 37 | 33–41 | moderate | + 2 | 0.36 | + 1 |
| Comparative Experiment G | 38 | none | 44 | none | slight | 0 | 0.49 | − 14 |
| Comparative Experiment H | 32 | 29–35 | 51 | 42–60 | marked | + 5 | 0.36 | − 2 |

EXAMPLE 5

The following materials are introduced into a ball mill having a capacity of 30,000 parts by volume and containing 30,000 parts of steel balls 4 to 6 mm in diameter: 3,500 parts of acicular gamma-iron(III) oxide particles having an average length of about $0.8\mu$; 45 parts of soybean lecithin; 21 parts of butyl stearate; 10 parts of a dimethylsilicone oil; 9 parts of stearic acid; 1,000 parts cles of less than $0.1\mu$, have a mean diameter of about $8\mu$ and a pH of 3.5.

TABLE 3

|  | Frictional force (g) | | | | Signs of wear after sustained operation test | | Head wear (mg) | Read voltage (deviations in % with reference to NBS reference tape) |
|---|---|---|---|---|---|---|---|---|
|  | Before sustained operation test | | After sustained operation test | | | | | |
|  | Mean value | Stick-slip motion | Mean value | Stick-slip motion | Scratching | Increase in errors | | |
| Example 5 | 24 | none | 27 | none | none | 0 | 0.19 | + 9 |
| Comparative Experiment I | 34 | 32–35 | 44 | 38–50 | slight | + 1 | 0.16 | + 14 |
| Comparative Experiment K | 29 | none | 40 | 35–45 | moderate | + 2 | 0.45 | − 4 |
| Comparative Experiment L | 24 | none | 42 | none | slight |  | 0.59 | − 24 |
| Comparative Experiment M | 33 | 30–35 | 47 | 39–56 | marked | + 9 | 0.41 | − 5 | of a polycaprolactone urethane having a K value of about 61 (measured in 1% strength solution in tetrahydrofuran) and a Shore A hardness of 70 (manufactured from 324 parts of polycaprolactone having a molecular weight of 830, 156 parts of neopentyl glycol, 514 parts of 4,4'-diisocyanatodiphenylmethane and 5 parts of trimethylolpropane), dissolved in 8,220 parts of a solvent mixture consisting of equal parts of tetrahydrofuran and dioxane; and 105 parts of the precipitated silica described in Example 1.

This mixture is dispersed for 70 hours. Further processing to give tapes, and the testing of these, is carried out as described in Example 1.

The test results obtained with the tapes of Example 5 and the corresponding Comparative Experiments I to M, described below, are given in Table 3.

COMPARATIVE EXPERIMENT I

The procedure of Example 5 is followed, but no precipitated silica is added.

COMPARATIVE EXPERIMENT K

The procedure of Example 5 is followed, but instead of the precipitated silica described there, 105 parts of silica in the form of finely ground quartz powder having a mean particle size of about $2\mu$ are employed. The particles are polyhedral, with fractured edges and corners.

COMPARATIVE EXPERIMENT L

The procedure of Example 5 is followed, but instead of the precipitated silica described there, 105 parts of silica in the form of finely ground quartz powder having a mean particle size of about $12\mu$ are used. The particles are polyhedral, with sharp fractured edges and corners.

COMPARATIVE EXPERIMENT M

The procedure of Example 5 is followed, but instead of the precipitated silica described there, 105 parts of a pyrogenic inactive silica are used. The secondary particles of this silica, which are composed of primary particles of less than $0.1\mu$, have a mean diameter of about $8\mu$ and a pH of 3.5.

As may be seen from Tables 1 to 3, the tapes obtained according to Examples 1 to 5, which contain precipitated silica having a secondary particle diameter of about $3\mu$, exhibit a combination of particularly advantageous frictional properties and very good running properties in sustained operation and at the same time a high signal level and only slight abrasivity. By contrast, the tapes of the Comparative Experiments, which contain silica in a different form, i.e., quartz powder or pyrogenic silica, in general have less advantageous frictional properties. It is true that the use of quartz powder reduces the coefficient of friction and stick-slip motion after sustained operation but at the same time it gives an unfavorable signal level and causes very high head wear. The use of pyrogenic silica having a secondary particle diameter of about $8\mu$ is unable to reduce the coefficient of friction and stick-slip motion after sustained operation to the desired extent.

We claim:

1. A magnetic recording medium comprising a flexible base and, applied thereto, at least one firmly adhering magnetic layer, at least the uppermost magnetic layer consisting essentially of finely divided magnetic particles and non-magnetic particles in an organic binder mixture, wherein the non-magnetic particles used are particles of precipitated silica having a mean primary particle diameter of from 0.02 to $0.1\mu$, a mean secondary particle diameter of from 2 to $4\mu$, a pH of from 5 to 8, a loss of weight on drying from about 2 to 5% and a loss of weight on ignition of from about 4 to 6%.

2. A magnetic recording medium as set forth in claim 1, wherein at least one magnetic layer contains the precipitated silica in an amount of from 0.5 to 8, percent by weight, based on the dry magnetic layer.

3. A magnetic recording medium as set forth in claim 1 wherein at least one magnetic layer contains the precipitated silica in an amount of 1 to 4 percent by weight, based on the dry magnetic layer.

* * * * *